US006586511B1

(12) United States Patent
Rajagopalan et al.

(10) Patent No.: US 6,586,511 B1
(45) Date of Patent: *Jul. 1, 2003

(54) GOLF BALL COMPOSITIONS AND METHOD OF MAKING SAME

(75) Inventors: Murali Rajagopalan, South Dartmouth, MA (US); Kevin M. Harris, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/759,329

(22) Filed: Jan. 16, 2001

Related U.S. Application Data

(63) Continuation of application No. 09/132,193, filed on Aug. 10, 1998, now Pat. No. 6,255,361, which is a continuation-in-part of application No. 08/978,510, filed on Nov. 25, 1997, now Pat. No. 5,869,578, which is a continuation of application No. 08/560,763, filed on Nov. 21, 1995, now abandoned.

(51) Int. Cl.[7] .................. A63B 37/12; A63B 37/02; C08K 5/09
(52) U.S. Cl. .................. 524/320; 473/354; 473/355; 473/357; 473/365; 473/372; 473/373; 473/374; 473/377; 473/378; 473/385
(58) Field of Search .................. 524/320; 473/354, 473/355, 357, 365, 372, 373, 374, 377, 378, 385

(56) References Cited

U.S. PATENT DOCUMENTS

| | | | |
|---|---|---|---|
| 3,264,272 A | 8/1966 | Rees .................. 260/78.5 |
| 3,472,825 A | 10/1969 | Walter et al. .................. 260/88.1 |
| 3,819,768 A | 6/1974 | Molitor .................. 260/897 B |
| 3,926,891 A | 12/1975 | Gross et al. .................. 260/29.6 E |
| 3,970,626 A | 7/1976 | Hurst et al. .................. 260/29.6 WB |
| 4,295,652 A | 10/1981 | Saito et al. .................. 273/235 R |
| 4,323,247 A | 4/1982 | Keches et al. .................. 273/235 R |
| 4,431,193 A | 2/1984 | Nesbitt .................. 273/235 R |
| 4,508,309 A | 4/1985 | Brown .................. 249/81 |
| 4,526,375 A | 7/1985 | Nakada .................. 273/235 R |
| 4,638,034 A | 1/1987 | McClain .................. 525/369 |
| 4,884,814 A | 12/1989 | Sullivan .................. 273/235 R |
| 4,911,451 A | 3/1990 | Sullivan et al. .................. 273/235 R |
| 5,155,157 A | 10/1992 | Statz et al. .................. 524/423 |
| 5,218,057 A | 6/1993 | Kurkov et al. .................. 525/369 |
| 5,306,760 A | 4/1994 | Sullivan .................. 524/400 |
| 5,324,783 A | 6/1994 | Sullivan .................. 525/196 |
| 5,367,028 A | 11/1994 | Hamada et al. .................. 525/221 |
| 5,407,998 A | 4/1995 | Horiuchi et al. .................. 525/133 |
| 5,508,351 A | 4/1996 | Horiuchi et al. .................. 525/196 |
| 5,542,677 A | 8/1996 | Sullivan et al. .................. 473/385 |
| 5,554,698 A | 9/1996 | Wang et al. .................. 525/330.2 |
| 5,616,640 A | 4/1997 | Harris .................. 473/378 |
| 5,631,324 A | 5/1997 | Rajagopalan et al. .................. 473/385 |
| 5,704,854 A | 1/1998 | Higuchi et al. .................. 473/373 |
| 5,779,561 A * | 7/1998 | Sullivan |
| 5,869,578 A | 2/1999 | Rajagopalan .................. 525/330.2 |
| 5,929,189 A | 7/1999 | Ichikawa et al. .................. 528/76 |
| 5,959,059 A | 9/1999 | Vedula et al. .................. 528/76 |
| 6,114,455 A | 9/2000 | Dalton .................. 525/221 |
| 6,241,625 B1 | 6/2001 | Yokota et al. .................. 473/373 |
| 6,255,361 B1 * | 7/2001 | Rajagopalan |
| 6,309,314 B1 | 10/2001 | Sullivan et al. .................. 473/378 |

FOREIGN PATENT DOCUMENTS

| | | |
|---|---|---|
| CA | 963380 | 2/1975 |
| EP | 0104316 B1 | 11/1987 |
| EP | 0276956 B1 | 8/1988 |
| WO | WO 97/19114 | 5/1997 |

OTHER PUBLICATIONS

Ebewele "Polymer Science and Technology" pp. 182, 428, 1992.*

* cited by examiner

Primary Examiner—David J. Buttner
(74) Attorney, Agent, or Firm—Swidler Berlin Shereff Friedman, LLP

(57) ABSTRACT

The present invention is directed to a golf ball and to a process for forming a golf ball having at least one layer, where the layer is formed of a saponified polymer/oxa acid blend, having from about 65 to about 99 parts of at least one saponified polymer and from about 35 to 1 parts of at least one oxa acid, based on 100 parts by weight of the saponified polymer/oxa acid blend. The layer may be foamed or unfoamed, and may form at least a portion of any of the cover, the core, or a mantle layer situated between the cover and the core.

38 Claims, No Drawings

GOLF BALL COMPOSITIONS AND METHOD OF MAKING SAME

CROSS-REFERENCE TO RELATED APPLICATIONS

This application is a continuation of U.S. application Ser. No. 09/132,193, filed Aug. 10, 1998, now U.S. Pat. No 6,255,361, which is a continuation-in-part of U.S. application Ser. No. 08/978,510, filed on Nov. 25, 1997, now U.S. Pat. No. 5,869,578, which is a continuation of U.S. application Ser. No. 08/560,763, filed on Nov. 21, 1995 (now abandoned). Each of these applications is incorporated herein in its entirety by reference.

FIELD OF THE INVENTION

The present invention relates to golf balls and, in particular, to golf balls having at least one layer comprising a blend of at least one saponified polymeric material and at least one oxa acid. The saponified polymeric material may be unmodified, or may contain at least one pendant functional group that is grafted to the polymer chain. The layer, which may be foamed or unfoamed, may be located in any of the cover or core of the ball or in a mantle layer located between the cover and the core.

BACKGROUND OF THE INVENTION

Three-piece, wound golf balls with balata covers are preferred by many expert golfers. These balls provide a combination of distance, high spin rate, and control that is not available with other types of golf balls. However, balata is easily damaged in normal play, and, thus, lacks the durability required by the average golfer.

In contrast, amateur golfers typically prefer a solid, two-piece ball with an ionomer cover, which provides a combination of distance and durability. Because of the hard ionomer cover, these balls are almost impossible to cut, but also have a very hard "feel", which many golfers find unacceptable, and a lower spin rate, making these balls more difficult to draw or fade. The differences in the spin rate can be attributed to the differences in the composition and construction of both the cover and the core.

Many attempts have been made to produce a golf ball with the control and feel of a wound balata ball and the durability of a solid, two-piece ball, but none have succeeded totally. In various attempts to produce an ideal golf ball, the golfing industry has blended hard ionomer resins (i.e., those ionomer resins having a hardness of about 60 to 66 on the Shore D scale, as measured in accordance with ASTM method D-2240) with a number of softer polymeric materials, such as softer polyurethanes. However, the blends of the hard ionomer resins with the softer polymeric materials have generally been unsatisfactory in that these balls exhibit numerous processing problems. In addition, the balls produced by such a combination are usually short on distance.

While different blend combinations of species of one variety of polymer, such as prior art ionomers, i.e., copolymers of an olefin and an α,β-unsaturated carboxylic acid, have been successfully used in the prior art, different polymers, such as carboxylic acid based ionomers and balata or other non-ionic polymers have not been successfully blended for use in golf ball covers. In general, prior art blends of polymer components are immiscible, i.e., heterogeneous on a microscopic scale, and incompatible, i.e., heterogeneous on a macroscopic scale, unless strong interactions are present between the polymer components in the mixture, such as those observed between carboxylic acid based ionomers and other polymers containing carboxylic acid groups. In particular, this lack of compatibility exists when an ionomer is blended with a polyolefin homopolymer, copolymer, or terpolymer that does not contain ionic, acidic, basic, or other polar pendant groups, and is not produced with a metallocene catalyst. These mixtures often have poor tensile strength, impact strength, and the like. Hence, the golf balls produced from these incompatible mixtures will have inferior golf ball properties such as poor durability, cut resistance, and so on. In contrast, a compatible blend may be heterogeneous on a microscopic scale, but is homogeneous on a macroscopic scale, and, thus, has useful golf ball properties.

In this regard, U.S. Pat. No. 5,397,840 discloses golf ball covers including a blend of "ionic copolymers" and "non-ionic copolymers". However, the "ionic copolymers" are defined as copolymers of an a-olefin and a metal salt of an α,β-unsaturated carboxylic acid, and the "non-ionic copolymers" are copolymers or terpolymers containing ethylene or propylene and acrylic or methacrylic acid monomers. Therefore, strong interactions exist between the metal salts of the "ionic copolymers" and the acrylic or methacrylic acid monomers of the "non-ionic copolymers" that allow compatible blends to be formed. These interactions do not exist in prior art blends of ionomers and polymers that are truly non-ionic or nonpolar.

U.S. Pat. No. 5,616,640 to Harris et al. discloses golf ball cover compositions comprising an oxa acid compound having the formula

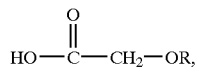

which may be blended with prior art, carboxylic acid based ionomers to provide golf balls having an excellent spin rate and good shear resistance.

Co-pending application Ser. No. 08/978,510 discloses golf balls comprising "saponified ionomers", i.e., ester based ionomeric polymers produced by carrying out a hydrolysis or saponification on copolymers containing pendant ester groups to form an ionomeric polymer that is less hydrophilic than typical carboxylic acid based ionomers to provide golf balls having enhanced physical properties when compared to prior art golf balls.

However, there is no known disclosure of golf balls comprising compatible blends of oxa acids and saponified ionomers.

Hydrolysis or saponification of alkyl acrylate units in a crosslinkable polymer chain is disclosed by Gross in U.S. Pat. No. 3,926,891. This is accomplished by dissolving the polymer in an aqueous alkali metal hydroxide solution and then heating. The product is recovered by coating the solution onto a substrate and evaporating the water or by extruding the solution into a non-solvent. In U.S. Pat. No. 3,970,626, Hurst discloses heating a mixture of an alkali metal hydroxide, a thermoplastic ethylene-alkyl acrylate copolymer and water to saponify the acrylate units and form an aqueous emulsion. This emulsion can be used as such, partially dried to a paste or moist solid, or fully dried to solid form.

A different approach to hydrolysis or saponification of an ethylene-alkyl acrylate copolymer is disclosed by Kurkov in U.S. Pat. No. 5,218,057, in which the copolymer is mixed with an aqueous solution of an inorganic alkali metal base at a temperature sufficient for saponification to take place and at which the copolymer undergoes a phase change. Typically, the copolymer would be molten when mixed with the aqueous solution.

Each of these prior methods, with the exception of that disclosed in co-pending application Ser. No. 08/978,510, requires that the polymer component be in contact with water, either by conducting the reaction in an aqueous medium or by adding an aqueous solution to the polymer. Processes of this nature pose several disadvantages, however. First, it is difficult to remove water from the hydrolyzed or saponified polymer product. The polymer product is in the form of a salt that has a more polar nature than the reactant acrylate ester, and so is more likely to associate with or hydrogen bond to a polar solvent like water. The energy required to remove a highly interacting polar solvent like water is much greater than for a nonpolar or weakly polar organic solvent. Second, it is important to remove water from the ionomer product because the presence of water can have detrimental effects on ionomer mechanical properties imparted by the polar ionic domains, which act as the effective crosslink sites. Residual water weakens the ionic interactions within these domains, thereby reducing the mechanical property benefits the domains impart. Finally, incomplete removal of water can lead to difficulty in later fabricating steps where the product ionomer is reheated and shaped, e.g., into golf ball covers. Residual water can cause undesirable irregularities and imperfections on the surface of fabricated articles by the formation of blisters. Residual water within fabricated polymer articles can lead to void formation and even uncontrolled foaming with a concomitant undesirable influence on the mechanical properties, load bearing capacity and durability of the fabricated articles.

Melt state neutralization of an ethylene-acrylic acid copolymer by a solid, solution or slurry of an alkali metal salt is disclosed by Walter in U.S. Pat. No. 3,472,825. In the examples provided, hydrolysis is accomplished by mixing an alkali hydroxide with copolymer at constant temperature either in a Banbury mixer or on a two roll mill. Walter does not disclose the use of extrusion type polymer processing apparatus for this neutralization.

McClain, in U.S. Pat. No. 4,638,034, discloses a process whereby ethylene-acrylic acid copolymers or their ionomers are prepared from ethylene-alkyl acrylate copolymers by saponifying the latter in the melt with metal hydroxides to form an ionomer and a by-product, i.e., alkanol, then optionally acidifying the ionomer to form the free acid copolymer. This process proceeds in the molten state and in the absence of solvent or water, other than the by-product alkanol. Saponification proceeds under non-static mixing conditions, typically with equipment commonly employed in the art of mixing molten polymer materials such as multiroll mills, a Banbury mixer or a twin screw extruder.

The process disclosed by the '034 reference is, however, incapable of providing optimal product quality since blending and saponifying in a single operation as taught by the subject reference leads to rapid hydrolysis, with a concurrent rapid increase in viscosity. Due to this rapid increase in viscosity, the resultant mixture is non-uniform and therefore the physical properties of products made from this material are not consistent throughout the product.

During the melt state conversion of the alkyl-acrylate copolymer to the metal acrylate copolymer salt, a great decrease in melt flow rate occurs with a corresponding great increase in melt viscosity. While not wishing to be bound by any particular theory, this decreased melt flow rate is thought to occur because of the tendency of the relatively polar ionic salt functionalities formed during the saponification reaction to associate with themselves rather than the relatively nonpolar unreacted alkyl acrylate or comonomer chain segments. Aggregations of salt moieties arising from side groups attached to different chains into ionic domains introduces effective crosslink points throughout the molten copolymer. The effective crosslinks, in turn, greatly increase the copolymer melt viscosity and, correspondingly, greatly decrease copolymer melt flow rate.

A need exists in the golf ball art for highly durable golf balls, which have improved performance, and may be tailored to have virtually any combination of feel and spin rate. The present invention provides such a golf ball.

SUMMARY OF THE INVENTION

The present invention is directed to a golf ball having least one layer, where the layer is formed of a saponified polymer/oxa acid blend, comprising from about 65 to about 99 parts, preferably from about 75 to about 99 parts, and most preferably from about 85 to about 99 parts of at least one saponified polymer and from about 35 to 1 parts, preferably from about 25 to about 1 parts, and most preferably from about 15 to about 1 parts of at least one oxa acid, based on 100 parts by weight of the saponified polymer/oxa acid blend. The layer may be foamed or unfoamed, and may form at least a portion of any of the cover, the core, or a mantle layer or other intermediate layer situated between the cover and the core, where the core may be wound, solid, hollow, or filled with a fluid or a gel.

Preferred oxa acids include monoacids of formula:

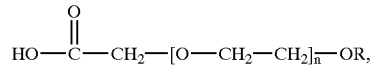

and diacids of formula:

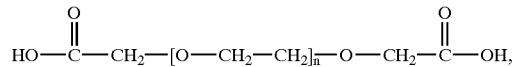

wherein n is an integer greater than or equal to 1, preferably from 1 to 27, and R is typically H or $CH_3$, but may also be any organic moiety selected from the group consisting of a linear or branch chained alkyl, a substituted or unsubstituted carbocyclic or heterocyclic groups.

The saponified polymer typically comprises a first olefinic, monomeric component having from 2 to 8 carbon atoms and a second monomeric component comprising an unsaturated carboxylic acid based acrylate class ester having from 4 to 22 carbon atoms and at least one ester group, wherein at least a portion of the ester groups have been saponified with an inorganic metal base. Useful inorganic metal bases include, but are not limited to metal bases comprising at least one metallic cation, such as lithium, sodium, potassium, cesium, magnesium, calcium, barium, manganese, copper, zinc, titanium, tungsten, zirconium, and aluminum, and at least one anion, such as hydroxide, alkoxide, acetate, carbonate, bicarbonate, oxide, formate, and nitrate.

Typically, the first monomeric component is an α-olefin monomer having a terminal point of unsaturation, and may be of the formula:

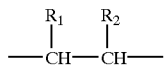

where $R_1$ is hydrogen or an alkyl group, and $R_2$ is hydrogen, lower alkyl including $C_1$–$C_5$, carbocyclic, aromatic or heterocyclic. Preferably, the first monomeric component is ethylene.

Typically, the first monomeric component comprises from about 1 to about 99 percent by weight of the total polymer weight, preferably from about 10 to about 95 percent by weight of the total polymer weight, and most preferably from about 10 to about 70 percent by weight of the total polymer weight.

The second monomeric component is typically an unsaturated acrylate class ester having the formula:

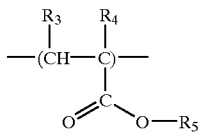

where $R_3$ is hydrogen or an alkyl group; $R_4$ is hydrogen, lower alkyl including $C_1$–$C_5$, carbocyclic, aromatic or heterocyclic; $R_5$ is selected from the group consisting of $C_nH_{2n+}$, for n=1 to 18 and phenyl, in which from 0 to 5 H within $R_4$ can be replaced by substituents selected from the group consisting of COOH, $SO_3H$, $NH_2$, succinic anhydride and their salts, F, Cl, Br, I, OH, SH, epoxy, silicone, lower alkyl esters, lower alkyl ethers, and aromatic or heterocyclic rings with the proviso that $R_4$ and $R_5$ can be combined to form a bicyclic ring. Typically, the second monomeric component comprises from about 99 to about 1 percent by weight of the total polymer weight, preferably, from about 90 to about 5 percent by weight of the total polymer weight, and most preferably, from about 90 to about 30 percent by weight of the total polymer weight.

The saponified polymer may also comprise a third monomeric component. Useful third monomeric components include carbon monoxide, sulfur dioxide, an anhydride monomer, an unsaturated monocarboxylic acid, an olefin having from 2 to 8 carbon atoms and a vinyl ester or a vinyl ether of an alkyl acid having from 4 to 21 carbon atoms. Preferred third monomeric components include monomers of formula:

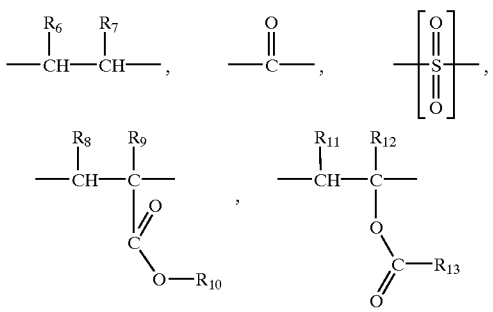

wherein:
- $R_6$ is hydrogen, lower alkyl including $C_1$–$C_5$, carbocyclic, aromatic or heterocyclic;
- $R_7$ is hydrogen, lower alkyl including $C_1$–$C_5$, carbocyclic, aromatic or heterocyclic;
- $R_8$ is hydrogen, lower alkyl including $C_1$–$C_5$, carbocyclic, aromatic or heterocyclic;
- $R_9$ is hydrogen or lower alkyl including $C_1$–$C_5$;
- $R_{10}$ is hydrogen, or is selected from the group consisting of $C_nH_{2+n}$, for n=1 to 18 and phenyl, in which from 0 to 5 H within $R_{10}$ can be replaced by substituents selected from the group consisting of COOH, $SO_3H$, $NH_2$ and their salts, F, Cl, Br, I, OH, SH, silicon, lower alkyl esters, lower alkyl ethers and aromatic or heterocyclic rings with the proviso that $R_9$ and $R_{10}$ can be combined to form a bicyclic ring;
- $R_{11}$ is hydrogen, lower alkyl including $C_1$–$C_5$, carbocyclic, aromatic or heterocyclic;
- $R_{12}$ is hydrogen or lower alkyl including $C_1$–$C_5$;
- $R_{13}$ is hydrogen, or is selected from the group consisting of $CH_{2n+1}$, for n=1 to 18 and phenyl, in which from 0 to 5 H within $R_{13}$ can be replaced by substituents selected from the group consisting of COOH, $SO_3H$, $NH_2$ and their salts, F, Cl, Br, I, OH, SH, epoxy, silicon, lower alkyl esters, lower alkyl ethers and aromatic or heterocyclic rings with the proviso that $R_{12}$ and $R_{13}$ can be combined to form a bicyclic ring.

Typically, the third monomeric component comprises from about 0 to 49 percent by weight of the total polymer weight of the saponified polymer. The monomeric components of the polymer may be present in a random, alternating, block or graft arrangement, and the saponified polymers may be isotactic, syndiotactic, atactic polymers, or a combination thereof.

A grafting agent may also be added to the saponified polymer to form a grafted polymer. The preferred grafting agent is an anhydride having the formula:

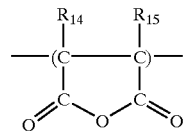

where $R_{14}$ and $R_{15}$ are the same or different, and are typically hydrogen, linear or branched chain alkyl, or substituted or unsubstituted carboxylic groups.

The grafting agent is typically added in an amount of between about 1 to about 50 percent by weight, preferably from about 1 to about 25 percent by weight, and most preferably from about 1 to about 15 percent by weight of the polymer.

The present invention is also directed to a process for forming a golf ball. The method of the invention comprises blending a saponified polymer with at least one oxa acid to form a saponified polymer/oxa acid blend; and forming at least one layer of a golf ball from the saponified polymer/oxa acid blend.

Preferably, the method of the invention further comprises forming a polymer comprising a first olefinic monomeric component having from 2 to 8 carbon atoms and a second monomeric component comprising an unsaturated carboxylic acid based acrylate class ester having from 4 to 22 carbon atoms; applying a sufficient amount of heat to the polymer to convert the polymer to a substantially molten state; forming a mixture by adding an inorganic metal base to the molten polymer; saponifying the mixture to form a saponified polymer, where a sufficient amount of the inorganic metal base is added to the molten polymer in forming the mixture to obtain a degree of saponification of the polymer ranging between about 1 and 50 percent. Most preferably the mixture of the inorganic metal base and the molten polymer is formed at a temperature at which the viscosity of the mixture remains substantially unchanged from the viscosity of the molten polymer Optionally, the polymer further comprises a third monomeric component, such as carbon monoxide, sulfur dioxide, an anhydride monomer, an unsaturated monocarboxylic acid, an olefin having from 2 to 8 carbon atoms, or a vinyl ester or a vinyl ether of an alkyl acid having from 4 to 21 carbon atoms.

DETAILED DESCRIPTION OF THE PREFERRED EMBODIMENTS

As used herein, the terms "saponified polymer" and "saponified ionomer" refer to a polymer comprising at least one olefin and at least one unsaturated monomer that contains a pendant ester group, where at least some of the pendant ester groups have been hydrolyzed or saponified. Saponified ionomers differ from prior art ionomers in that any pendant groups that are not modified by the saponification process are ester groups in contrast to the pendant carboxylic acid groups that remain after neutralization in prior art ionomers.

The terms "saponified polymer/oxa acid blend" and "saponified/oxa acid blend", as used herein, refers to any polymer blend that comprises at least one saponified polymer and at least one oxa acid.

As used herein, the term "layer" includes any generally spherical portion of a golf ball or golf ball core, center, or mantle, including one-piece cores and one-piece balls. A "mantle" or other intermediate layer is defined herein as a portion of the golf ball that occupies a volume between the cover and the core. Of course, as one of ordinary skill in the art would recognize, any of the core, cover, and mantle of the golf balls of the invention can be formed of one layer or a plurality of layers, as that term is defined herein.

As used herein, the term "metallocene catalyzed polymer" refers to any polymer, copolymer, or terpolymer, and, in particular, any polyolefin, polymerized using a metallocene catalyst. The term "grafted metallocene catalyzed polymer" refers to any metallocene catalyzed polymer in which the metallocene catalyzed polymer has been subjected to a post-polymerization reaction to graft at least one functional group onto the metallocene catalyzed polymer. Similarly, the term "non-grafted metallocene catalyzed polymer" refers to any metallocene catalyzed polymer in which the metallocene catalyzed polymer has not been subjected to such a post-polymerization reaction. Accordingly, the term "metallocene catalyzed polymer" encompasses both non-grafted metallocene catalyzed polymers and grafted metallocene catalyzed polymers.

The present invention relates to golf balls including at least one foamed or unfoamed layer that comprises a blend of at least one saponified polymer and at least one oxa acid, i.e., a saponified polymer/oxa acid blend. As noted above, the layer may be in any of the core, the cover, or a mantle layer situated between the cover and the core.

Golf balls of the invention comprising saponified polymer/oxa acid blends useful in the invention comprise at least one layer of a blend of at least one oxa acid and at least one saponified polymer, comprising from about 65 to about 99 parts, preferably from about 75 to about 99 parts, and most preferably from about 85 to about 99 parts of at least one saponified polymer and from about 35 to 1 parts, preferably from about 25 to about 1 parts, and most preferably from about 15 to about 1 parts of at least one oxa acid, based on 100 parts by weight of the saponified polymer/oxa acid blend. Typically, the layer has a thickness of from about 0.005 to about 0.125 inch and a Shore D hardness of from about 15 to about 80. Where the layer is foamed, the polymer blends may be foamed during molding by any conventional foaming or blowing agent. Preferably, foamed layers incorporating a saponified polymer/oxa acid blend have a flexural modulus of from about 1000 to about 150,000 psi.

Saponified polymer/oxa acid blends in accordance with the invention, comprising at least one saponified polymer and at least one oxa acid, may be thermoformed, and, thus, can be either compression or injection molded to form a layer of foamed or unfoamed saponified polymer/oxa acid blend in the cover, core, or mantle of a golf ball according to the invention. Blends of oxa acids and saponified polymers are resilient, easily processed materials that allow highly durable golf balls to be produced with improved performance and virtually any combination of feel and spin rate.

Golf balls according to the invention may incorporate cores comprising saponified polymer/oxa acid blends, as well as saponified polymers or polymer blends, grafted metallocene catalyzed polymers or polymer blends, non-grafted metallocene catalyzed polymers or polymer blends, or conventional materials, such as poly-butadiene. Cores comprising a blend of at least one saponified polymer and at least one oxa acid may be either one-piece, comprising a single piece of foamed or unfoamed saponified polymer/oxa acid blend, or multi-piece, comprising a liquid or solid core or center and one or more layers in which any of the center or at least one of the layers comprises a foamed or unfoamed blend of a saponified polymer and an oxa acid.

Conventional materials useful in centers, cores, or core layers of the golf balls of the invention include, but are not limited to, compositions having a base rubber, a crosslinking agent, and a filler. The base rubber typically includes natural or synthetic rubbers. A preferred base rubber is 1,4-polybutadiene having a cis-structure of at least 40 percent. Natural rubber, polyisoprene rubber and/or styrene-butadiene rubber may be optionally added to the 1,4-polybutadiene. Crosslinking agents include metal salts of unsaturated fatty acids, such as zinc or magnesium salts of acrylic or methacrylic acid. The filler typically includes materials such as zinc oxide, barium sulfate, silica, calcium carbonate, zinc carbonate and the like. Golf balls of the invention may also have conventional wound cores, where the core comprises a liquid or solid center wrapped in elastomeric windings.

Golf balls of the invention may also include a mantle layer or other intermediate layer situated between the cover and the core. Preferably, the mantle layer comprises a least one foamed or unfoamed layer that comprises a saponified polymer/oxa acid blend, but may also be formed from-a saponified polymer or polymer blend, a grafted or non-grafted metallocene catalyzed polymer or polymer blend, or from any other suitable polymeric material having the desired properties, including, but not limited to, block copolymers of a poly(ether-ester), such as HYTREL®, available from DuPont, block copolymers of a poly(ether-amide), such as PEBAX®, available from Elf Atochem, styrene-butadiene-styrene and styrene-(ethylene-propylene)-styrene or styrene-(ethylene-butylene)-styrene block copolymers, and their functionalized derivatives, such as KRATON D®, KRATON G®, and KRATON FG® from Shell Chemical.

Golf balls according to the invention may also incorporate cover layers comprising foamed or unfoamed saponified polymer/oxa acid blends, grafted metallocene catalyzed polymers or polymer blends, non-grafted metallocene catalyzed polymers or polymer blends, blends of saponified polymers, oxa acids, and metallocene catalyzed polymers or conventional materials, including balata and ionomer cover stock. Saponified polymer/oxa acid blend cover layers according to the invention may be used with conventional solid or wound cores, as well as those comprising saponified polymers or grafted or non-grafted metallocene catalyzed polymers or polymer blends. Preferably, the cover of a golf ball according to the invention is formed from a blend comprising at least one saponified polymer and at least one oxa acid.

The use of a foamed saponified polymer/oxa acid blend also allows the golf ball designer to vary the density or mass distribution of the ball to adjust the angular moment of inertia, and, thus, the spin rate and performance of the ball. Foamed materials also offer a potential cost savings due to the reduced use of polymeric material.

As used herein with regard to saponified polymers and oxa acids, the phrase "branched or straight chain alkyl" means any substituted or unsubstituted acyclic carbon-containing compounds. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkylene, for example, ethylene, propylene, butylene, pentene, hexene, heptene, octene, norbomene, nonene, decene and the like. The ordinary skilled artisan is familiar with numerous linear and branched alkyl groups, which are within the scope of the present invention.

In addition, such alkyl groups may also contain various substituents in which one or more hydrogen atoms has been replaced by a functional group. Functional groups include, but are not limited to hydroxyl, amino, carboxyl, sulfonic amide, ester, ether, phosphates, thiol, nitro, silane and halogen (fluorine, chlorine, bromine and iodine), to mention but a few.

As used herein, "substituted and unsubstituted carbocyclic" means cyclic carbon-containing compounds, including, but not limited to cyclopentyl, cyclohexyl, cycloheptyl, adamantyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As used herein, "substituted and unsubstituted aryl groups" refers to any functional group comprising a hydrocarbon ring having a system of conjugated double bonds, such as phenyl, naphthyl, anisyl, toluyl, xylenyl and the like. According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can include nitro groups.

As used herein, "heterocyclic groups" means closed cyclic carbon-containing compounds wherein one or more of the atoms in the ring is an element other than carbon, e.g. sulfur, nitrogen, etc, including but not limited to pyridine, pyrrole, furan, thiophene, and purine.

As used herein, the term "polymer" means any type of polymer including random polymers, block polymers, etc.

Saponified Polymers and Polymer Blends

Saponified polymers useful in the invention can be made from polymers of formula I:

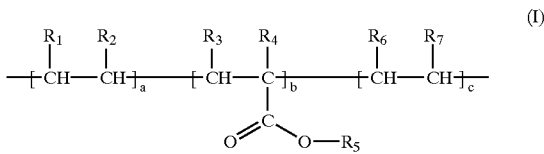

wherein:
$R_1$ is hydrogen, alkyl such as methyl, ethyl, and branched or straight chain propyl, butyl, pentyl, hexyl, heptyl, and octyl;

$R_2$ is hydrogen, lower alkyl including $C_1$–$C_5$ carbocyclic, aromatic or heterocyclic;

$R_3$ is hydrogen, alkyl such as methyl, ethyl and branched or straight chain propyl, butyl, pentyl, hexyl, heptyl and octyl;

$R_4$ is hydrogen, lower alkyl including $C_1$–$C_5$, carbocyclic, aromatic or heterocyclic;

$R_5$ is selected from the group consisting of $C_nH_{2n+1}$, for n=1 to 18 (which includes, for example, $CH_3$, $C_2H_5$, $C_3H_7$, $C_4H_9$, $C_5H_{11}$, $C_6H_{13}$, $C_7H_{15}$, $C_9H_{19}$, $C_{10}H_{21}$) and phenyl, in which from 0 to 5 H within $R_5$ can be replaced by substituents selected from the group consisting of COOH, $SO_3H$, $NH_2$, succinic anhydride and their salts, F, Cl, Br, I, OH, SH, epoxy, silicone, lower alkyl esters, lower alkyl ethers, and aromatic or heterocyclic rings, with the proviso that $R_4$ and $R_5$ can be combined to form a bicyclic ring;

$R_6$ is hydrogen, lower alkyl including $C_1$–$C_5$, carbocyclic, aromatic or heterocyclic;

$R_7$ is hydrogen, lower alkyl including $C_1$–$C_5$, carbocyclic, aromatic or heterocyclic; and wherein a, b and c are the relative percentages of each co-monomer.

Saponified polymers can also be formed from polymers of formula II:

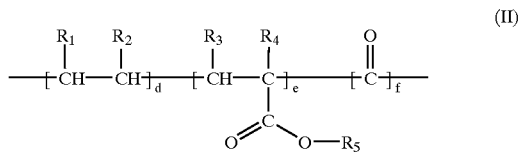

wherein:
$R_1$, $R_2$, $R_3$, $R_4$, and $R_5$ are as defined above; and wherein d, e and f are the relative percentages of each co-monomer;

from polymers of formula III:

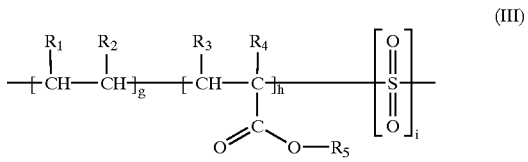

wherein:
$R_1$, $R_2$, $R_3$, $R_4$, and $R_5$ are as defined above; and wherein g, h, and i are the relative percentages of each co-monomer;

and from polymers of formula IV:

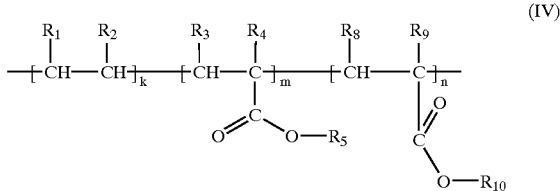

wherein:
$R_1$, $R_2$, $R_3$, $R_4$, and $R_5$ are as defined above; $R_8$ is hydrogen, lower alkyl including $C_1$–$C_5$, carbocyclic, aromatic or heterocyclic; $R_9$ is hydrogen or lower alkyl including $C_1$–$C_5$; and $R_{10}$ is hydrogen, or is selected from the group consisting of $C_nH_{2n+1}$, for n=1 to 18 and phenyl, in which from 0 to 5 H within $R_{10}$ can be replaced by substituents selected from the group consisting of COOH, $SO_3H$, $NH_2$, succinic anhydride and their salts, F, Cl, Br, I, OH, SH, epoxy, silicon, lower alkyl esters, lower alkyl ethers and aromatic or heterocyclic rings, with the proviso that $R_9$ and $R_{10}$ can be combined to form a bicyclic ring; and wherein k, m and n are the relative percentages of each co-monomer.

In addition, saponified polymers can be formed from polymers of formula V:

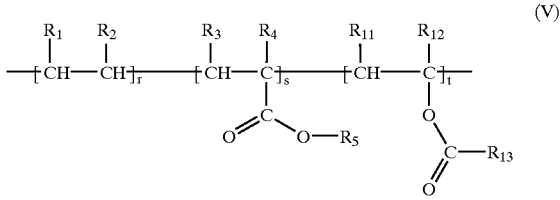

wherein:
$R_1$–$R_5$ are as defined above; $R_{11}$ is hydrogen, lower alkyl including $C_1$–$C_5$, carbocyclic, aromatic or heterocyclic; $R_{12}$ is hydrogen or lower alkyl including $C_1$–$C_5$; and $R_{13}$ is hydrogen or is selected from the group consisting of $C_nH_{2n+1}$ for n=1 to 18 and phenyl, in which from 0 to 5 H within $R_{13}$ can be replaced by substituents selected from the group consisting of COOH, $SO_3H$, $NH_2$, succinic anhydride and their salts, F, Cl, Br, I, OH, SH, epoxy, silicone, lower alkyl esters, lower alkyl ethers and aromatic or heterocyclic rings; and $R_{13}$ is the same as $R_{10}$, with the proviso that $R_{12}$ and $R_{13}$ can be combined to form a bicyclic ring; and wherein r, s and t are the relative percentages of each co-monomer.

In each of the polymers described above, $R_1$ and $R_2$ can be any combination of alkyl, carbocyclic or aromatic groups, for example, 1-cyclohexylpropyl, benzyl cyclohexylmethyl, 2-cyclohexylpropyl, 2,2-methylcyclohexylpropyl, 2,2-methylphenylpropyl, 2,2-methylphenylbutyl. Comonomer units according to the above formulae are easily manufactured according to techniques and synthetic strategies well known to the skilled artisan. These comonomers are also commercially available from a number of commercial sources.

Saponified polymers can be random, block or alternating polymers and may be made by blending two, three, four, five or more different monomers according to processes well known to one of ordinary skill in the art. Additionally, the subject polymers may be isotactic, syndiotactic or atactic, or any combination of these forms of types of polymers. The pendant groups creating the isotactic, syndiotactic or atactic polymers can be chosen to determine the interactions between the different polymer chains making up the resin to control the final properties of the resins used in golf ball covers. Aromatic and cyclic olefins can be used in the present invention as well as such specific groups as methyl and phenyl.

The comonomers described herein can be combined in a variety of ways to provide a final copolymer with a variety of characteristics. The letters a, d, g, k, and r represent numbers that can independently range from 1–99 percent, preferably from 10–95 percent, more preferably from 10–70 percent and, most preferably, from about 10–50 percent. The coefficients b, c, h, m and s can independently range from 99–1 percent, preferably from 90–5 percent, more preferably from 90–30 percent, and most preferred from 90–50 percent, and c, f, i, n and t can independently range from 0 to 49 percent.

Graft copolymers of the saponified polymers described above can also be prepared for use in forming golf balls. For example, graft polymers can be produced such that the graft segment making up the linkage between polymer chains comprises an anhydride, wherein "anhydride" is taken to mean a compound having the formula:

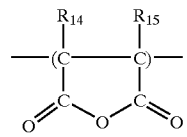

wherein:
$R_{14}$ and $R_{15}$ are the same or different and are chosen from among hydrogen, linear or branched chain alkyl and substituted or unsubstituted carboxylic groups. Alternately, however, other grafting agents containing double or triple bonds can be used. Examples of these materials include, but are not limited to, acrylates, styrene and butadiene.

Grafting the polymer molecules of the present invention can be accomplished according to any technique known in the art. See, e.g., *Block and Graft Copolymers*, by R. Ceresa, pub. by Butterworths, London, U.S. (1962), incorporated by reference herein. It is preferred that any grafting of the polymers of the present invention be accomplished by adding from about 1 to about 50 percent, or preferably from about 1 to about 25 percent and most preferably from about 1 to about 15 percent of a grafting agent, such as an anhydride according to the formula above. The grafting agents can be added either as a solid or a non-aqueous liquid, to a polymer according to the present invention. Such post reaction grafting can make the final grafted polymer more flexible.

Polymers that can be saponified for use in the present invention can be synthesized by a variety of methods, including metallocene catalysis, since it is well known in the art of polymer synthesis that many different synthetic protocols can be used to prepare a given compound. Different routes can involve more or less expensive reagents, easier or more difficult separation or purification procedures, straightforward or cumbersome scale-up, and higher or lower yield. The skilled synthetic polymer chemist knows well how to balance the competing characteristics of synthetic strategies. Thus, the saponified polymers useful in the present invention are not limited by the choice of synthetic strategy, and any synthetic strategy that yields the saponified polymers described above can be used.

Polymers useful for saponification preferably comprise: (1) a first monomeric component comprising an olefinic monomer having from 2 to 8 carbon atoms; (2) a second monomeric component comprising an unsaturated carboxylic acid based acrylate class ester having from 4 to 22 carbon atoms; and (3) an optional third monomeric component comprising at least one monomer selected from the group consisting of carbon monoxide, sulfur dioxide, an anhydride monomer, an unsaturated monocarboxylic acid, an olefin having from 2 to 8 carbon atoms and a vinyl ester or a vinyl ether of an alkyl acid having from 4 to 21 carbon atoms.

Saponified polymers are preferably prepared by adding a metal base or metal salt in the form of a solid or a solution to a polymer, such as the polymers described in the previous paragraph. Preferably, however, the metal base is in the form of a solid, such as a powder or a pellet. Powdered bases used in the invention preferably have an average powder particle diameter of from about 1 to 500 microns. More preferably, such powders have an average particle diameter of 10 to 100 microns. In the case of pellets, substantially any commercially available pellet particle size can be used.

Alternately, the metal base can be added in the form of a solution. Preferably, the solution is non-aqueous so that difficulties arising from incomplete removal of water during subsequent processing and use are avoided. Such non-aqueous solutions typically comprise solvents such as alcohol, acetic acid and acetic anhydride, although other solvents may, of course, be used.

The metal base comprises at least one metallic cation, such as lithium, Li, sodium, Na, potassium, K, cesium, Cs, magnesium, Mg, calcium, Ca, barium, Ba, zinc, Zn, manganese, Mn, copper, Cu, aluminum, Al, and at least one anion, such as hydroxide, alkoxide, acetate, carbonate, bicarbonate, oxide, formate, or nitrate.

The polymers described herein are preferably saponified or hydrolyzed by introducing the polymer into an extruder inlet zone, and melting and mixing the polymer in the inlet zone; passing the molten polymer through an addition zone within the extruder downstream from the inlet zone; and adding a metal base into the molten polymer as it passes through the addition zone. The base may be added to the molten polymer under saponification conditions until the polymer is at least partially saponified, as indicated by, for example, its melt index or by titrating versus an acid.

However, the metal base is preferably mixed with the polymer under non-saponification conditions. Instead of simultaneously mixing and saponifying or hydrolyzing as practiced in the prior art, these operations are carried out separately. In the first step, the polymer is heated to a substantially molten state at a temperature typically between about 50–350° C., depending upon the polymer chosen, to facilitate subsequent mixing with a metal base. This preheating step assures a greater degree of homogeneity in the final product, and provides a final product having correspondingly improved properties.

In the next step, the metal base is added to the molten polymer, and the polymer and metal base are extensively mixed under conditions in which no substantial hydrolysis occurs. A sufficient amount of metal base must be added overall to obtain a degree of saponification of the polymer between about 1 and about 50 percent. The mixing is carried out at a temperature slightly higher than the melting temperature of the polymer. For mixing on an extruder, the screw speed can be varied between about 20–500 rpm, depending upon the material's viscosity, i.e., the higher the viscosity, the greater the screw rpm required. Furthermore, as would be well understood by one of ordinary skill in the art, the depth of the conveying element of the extruder is chosen to prevent substantial hydrolysis of the material during mixing.

Alternately, the mixing may be accomplished using a roll mill. In such a case, the cylinder roll speed is adjusted to between about 5–100 rpm depending upon the viscosity of the material. Additionally, the mill gap is adjusted as necessary to control the amount of shear, and thus the degree of hydrolysis. The metal base may be added all at once to the molten polymer, or alternately it may be introduced in batches or stages.

In a third step, conditions are provided such that a hydrolysis or saponification reaction occurs between the polymer and the metal base. Saponification is achieved by continuous mixing of the polymer and base at an elevated temperature, which is substantially higher than the melting point temperature.

This novel process offers several improvements over the methods disclosed in the prior art. First, it provides for greater ease of mixing of the reactants before the reaction begins. Because the melt viscosity of the non-salt polymer is much lower than the salt polymer form, the melt mixing of the polymer and metal base is more readily carried out with lower input power requirements. Additionally, mixing of polymer and metal base is more uniform because there are no substantially hydrolyzed or saponified regions of low melt flow or high melt viscosity present within regions that have not yet reacted and, therefore, have high melt flow and low melt viscosity. Furthermore, the degree of mixing or dispersion of the base in the polymer is more easily controlled since melt flow rate is more uniform throughout the volume of molten polymer.

Once substantial saponification begins, the reaction is thought to be more uniform than the methods disclosed in the prior art. Although not wishing to be bound by any particular theory, the controlled dispersion of reactants in the mixing phase is thought to result in a more uniform melt morphology during the hydrolysis phase. The greater ability to control mixing and its uniformity provided by the multi-step process of this invention are thought to allow a finer morphological texture to develop as the hydrolysis reaction proceeds. That is, smaller size regions arise from dissimilar polarities of the polymer salt formed from hydrolysis and the relatively less polar nonreacted regions and comonomers. Additionally, the morphological texture that forms is not disrupted by excessive shear mixing. With reduced variation in the size or extent of high and low melt flow rate regions, the melt hydrolysis product is thought to be more uniform in postsolidification morphology and properties.

This process is preferably accomplished using a twin screw extruder wherein the twin screw extruder comprises melting, addition, and mixing zone means. The process can further be accomplished using a master batch comprising a concentrated amount of metal base in a polymer, with the same or different composition as the polymer introduced into the inlet zone, wherein the master batch is added from a side-stream extruder. The side-stream extruder can be a twin screw extruder comprising melting, addition, and mixing zone means.

Alternatively, the continuous process of saponifying or hydrolyzing the polymers useful in the invention comprises introducing the polymer into an inlet zone of an extruder, and melting and mixing the polymer in the inlet zone; passing the molten polymer through at least two addition zones connected in series; and adding a portion of a metal base into the molten polymer as it passes through each addition zone until the polymer is at least partially saponified.

This process can be accomplished using a twin screw extruder wherein the twin screw extruder comprises melting, addition, and mixing zone means. The process can further be accomplished using a single or a plurality of master batches comprising a concentrated amount of metal base in a polymer, with the same or different composition as the polymer introduced into the inlet zone, and with the same or different amount of metal base as the other master batches, wherein the master batch is added from a side-stream extruder. The process can be accomplished with a single or with multiple side-stream extruders which are twin screw extruders comprising melting, addition, and mixing zone means.

For use in saponified polymer/oxa acid blends of the present invention, a saponified polymer with ionomeric character can be blended with the other similar polymers, having a different metal base cation or distribution of cationic species than used to make the first saponified polymer, to yield a blend with desirable golf ball properties. Alternatively, two different saponified polymers with ionomeric character, having the same metal base cation can be blended to yield a useful blend. The two polymers can differ in their degree of hydrolysis, degree of subsequent acidification, molecular weight, molecular weight distribution, tacticity, blockiness, etc.

Oxa Acids

Oxa acids useful in the invention include monoacids of the formula:

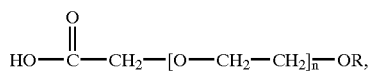

and diacids of formula:

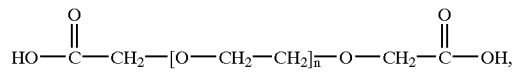

wherein n is an integer greater than or equal to 1, preferably from 1 to 27, and R is typically H or $CH_3$, but may be any organic moiety selected from the group consisting of a linear or branch chained alkyl, a substituted or unsubstituted carbocyclic or heterocyclic groups.

Any number of oxa acid compounds are contemplated as being useful in the present invention. Some specific oxa acids useful in the novel golf ball compositions of the present invention include 3,6-dioxaheptanoic acid having the formula:

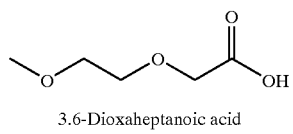

3,6-Dioxaheptanoic acid 3,6,9 trioxadecanoic acid, having the formula:

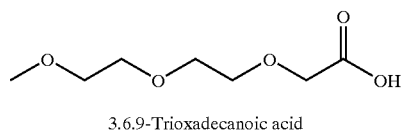

3,6,9-Trioxadecanoic acid 3,6,9-trioxaundecanedioic acid, having the formula:

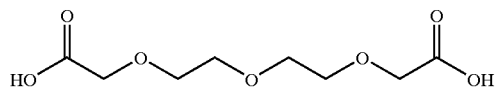

3,6,9-Trioxaundecanedioic acid and Polyglycol diacid, having the formula:

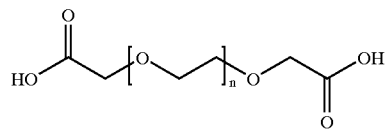

Polyglycol diacid ( n = 10–12)

Oxa acid compositions possess a variety of properties that make them useful in the present golf ball compositions. These properties include wide liquid ranges due to their low melting and high boiling points, high viscosity, good heat stability, solubility in media of widely differing polarity, development of surface-active properties, and good complexing properties for metal ions. This allows oxa acids to readily blend with saponified polymers to form the saponified polymer/oxa acid blends of the invention. In addition, oxa acid compositions are useful as comonomers in a number of resin compositions for positively influencing a variety of properties of the resulting polymers. Admixing oxa acids as a comonomer in the formation of polyesters, polyamides, polyurethanes and epoxy resins influences properties such as elasticity to avoid or eliminate cracking, viscosity and thixotropy, heat and light resistance, dyeability, static charging, mechanical resistance, wettability, initiation of polymerization, and molecular weight.

Numerous oxa acid compounds useful in the cover compositions of the present invention are available from Hoechst Celanese Corporation, Fine Chemicals Division under the trade name "Oxa Acids." See Hoechst Celanese Corporation's "Oxa Acids" Brochure (1994).

Additionally, the oxa acid compounds can be synthesized by a variety of synthetic routes known to the skilled organic chemist. It is well known in the art of organic synthesis that many different synthetic protocols can be used to prepare a given compound. Different routes can involve more or less expensive reagents, easier or more difficult separation or purification procedures, straightforward or cumbersome scale-up, and higher or lower yield. The skilled synthetic organic chemist knows well how to balance the competing characteristics of synthetic strategies. Thus the compounds of the present invention are not limited by the choice of synthetic strategy, and any synthetic strategy that yields the compounds described above can be used.

Saponified Polymer/Oxa Acid Blends

The saponified polymer/oxa acid blends of the present invention may be used alone or blended with other polymers or ionomers, according to methods well known in the art, to form compositions useful for forming golf balls.

For example, the saponified polymer/oxa acid blends of the present invention may be combined with thermoplastic ionomers, such as ethylene methacrylic acid ionomers and ethylene acrylic acid ionomers and their terpolymers, which are sold commercially under the trade names SURLYN® and IOTEK® by DuPont and Exxon respectively.

More preferably, the other polymers that can be used in conjunction with saponified polymer/oxa acid blends in golf ball covers include: block copolymers of a poly(ether-ester), such as HYTREL® available from DuPont, block copolymers of a poly(ether-amide), such as PEBAX®, available from Elf Atochem, styrene-butadiene-styrene block copolymers, such as the KRATON D® grades available from Shell Chemical, styrene-(ethylenc-propylene)-styrene or styrene-(ethylene-butylene)-styrene block copolymers, such as the KRATON G® series from Shell Chemical, either of the KRATON®s with maleic anhydride or sulfonic graft or functionality, such as the KRATON FD® or KRATON FG® series available from Shell Chemical, olefinic copolymers, such as the ethylene-acrylate or ethylene methacrylate series available from Quantum, metallocene catalyzed polymers, including ethylene-octene copolymers made from metallocene catalysts, available as the AFFINITY® or ENGAGE® series from Dow, and ethylene-alpha olefin copolymers and terpolymers made from metallocene catalysts, available as the EXACT® series from Exxon, block poly(urethane-ester) or block poly(urethane-ether) or block poly(urethane-caprolactone), such as the ESTANE series available from BF Goodrich, polyethylene glycol, such as CARBOWAX available from Union Carbide, polycaprolactone, polycaprolactam, polyesters, such as EKTAR available from Eastman, polyamides, such as nylon 6 or nylon 6,6, available from DuPont and ICI, ethylene-propylene-(diene monomer) terpolymers and their sulfonated or carboxylated derivatives, and PP/EPDM and dynamically vulcanized rubbers, such as SANTOPRENE from Monsanto.

The saponified polymer/oxa acid blends of the present invention can be prepared with or without the addition of a compatibilizer, and with varying molecular architecture of blend components, such as varying molecular weight, tacticity, degrees of blockiness, etc., as is well known to those knowledgeable in the art of blending polymers.

The amounts of polymers used in the present invention can vary from 1 to 99 parts of the saponified polymer/oxa acid blend to 99 to 1 parts of other polymers or ionomers, based on the total weight of polymers. More preferred ratios of 95 to 5 parts of the saponified polymer/oxa acid blend with 5 to 95 parts of one or more other polymers. Most preferred is from about 95 to about 10 parts of the subject saponified polymer/oxa acid blends and from about 5 to about 90 parts of the other polymer or ionomer.

Blending of the saponified polymer/oxa acid blends is accomplished in a conventional manner using conventional equipment. Good results have been obtained by mixing the resins in a solid, pelletized form and then placing the mix into a hopper which is used to feed the heated barrel of the injection molding machine. Further mixing is accomplished by a screw in the heated barrel. The injection molding machine is used either to make preformed half-shells for compression molding about a core or for molding flowable cover stock about a core using a retractable-pin mold. Such machines are conventional.

Additional components which can be added to the golf ball compositions of the present invention include U.V. stabilizers, reactive and non-reactive fillers, white pigments, e.g., $TiO_2$, $ZnO$, and $BaSO_4$, mica, talc, nano-fillers, colored pigments, fluorescent pigments, optical brighteners, light stabilizers, and metals, such as titanium, zinc, and tungsten.

The present polymers may be blended with any of the additional ingredients noted above, for example, to be used in a golf ball cover using any conventional blending technique. For example, the present compounds may be added to a vessel containing pelletized polymer resins and heated to 300 to 500° F. Thorough mixing of the materials is accomplished by means of a screw in the heated vessel.

The saponified polymer/oxa acid blends of the invention can be used to form any type of golf ball. In particular, two-piece golf balls comprising a cover surrounding a core are within the scope of the present invention, as are wound golf balls, in which a liquid, semi-solid or solid core is surrounded by an elastic synthetic material. The term "solid cores" as used herein refers not only to one piece cores but also to those cores having a separate solid layer beneath the cover and above the core, and other multilayer and/or non-wound cores. Any type of golf ball core can be used in the golf balls of the present invention. Preferred cores, however, include some amount of cis-butadiene. The subject polymers may also be used in golf balls having multiple covers and/or multiple cores.

Typically, the covers are formed around the solid or wound cores by either compression molding preformed half-shells of the cover stock material or by injection molding the cover stock about the core. Half-shells are made by injection molding a cover stock into a conventional half-shell mold in a conventional manner. The preferred method is compression molding of preformed half-shells.

In compression molding, the half-shells of the stock material are formed by injection molding the cover stock material, typically at 300° F. to 520° F., into a conventional half-shell mold for a short time. The preformed half-shells are then placed about a core and the assembly is introduced into a compression molding machine, and compression molded about a core, typically at about 250 to 500° F. The compression molding machine is a hydraulic press having an upper and lower mold plate, which have half molds, each of which is registered with another half mold in the opposite mold plate. The molded balls are then cooled while still in the mold, and finally removed when the cover is hard enough to be handled without deforming.

Alternatively, golf balls can be covered solely with the use of an injection molding technique. In injection molding, an injection molding machine is utilized in which the core assembly is placed in a mold cavity. The core assembly is held in place through the use of several retractable pins. Such injection molding machines are well known in the art. The molten cover material is injected into the cavity surrounding the core. As the cover material cools and hardens, the pins retract and the molded ball is ejected from the mold. The balls then undergo conventional finishing operations such as buffing, painting and stamping. This type of cover construction is generally referred to as a one-piece cover.

The present invention can be used in forming golf balls of any desired size. While "The Rules of Golf" by the USGA dictates that the size of a competition golf ball be no less than 1.680 inches in diameter, golf balls of any size can be used for leisure golf play. Therefore, while the preferred diameter of the golf balls is from about 1.680 inches to about 1.800 inches, golf balls of any size are within the scope of the present invention.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments that fall within the true spirit and scope of the present invention.

What is claimed is:

1. A golf ball comprising a core, at least one intermediate layer, and at least one cover layer, wherein the core comprises a base rubber, a crosslinking agent and a filler, and wherein the at least one intermediate layer is formed of a saponified polymer/oxa acid blend, comprising from about 65 to about 99 parts of at least one saponified polymer and from about 35 to 1 parts of at least one oxa acid, based on 100 parts by weight of the saponified polymer/oxa acid blend.

2. The golf ball according to claim 1, the at least one intermediate layer has a hardness of about 15 Shore D to about 80 Shore D.

3. The golf ball according to claim 1, the base rubber comprises 1,4-polybutadiene.

4. The golf ball according to claim 3, wherein at least a portion of the at least one cover layer comprises a saponified polymer/oxa blend.

5. The golf ball according to claim 1, wherein the oxa acid is a monoacid of the formula:

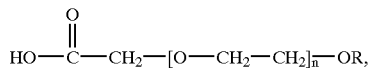

wherein n is an integer greater than or equal to 1, and R is H or an organic moiety selected from the group consisting of linear and branch chained alkyl, substituted and unsubstituted carbocyclic, and heterocyclic groups.

6. The golf ball according to claim 1, wherein the oxa acid is a diacid of the formula:

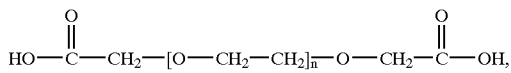

wherein n is an integer greater than or equal to 1.

7. The golf ball according to claim 1, wherein the saponified polymer comprises a first olefinic, monomeric component having from 2 to 8 carbon atoms and a second monomeric component comprising an unsaturated carboxylic acid based acrylate class ester having from 4 to 22 carbon atoms and at least one ester group, wherein at least a portion of the ester groups have been saponified with an inorganic metal base.

8. The golf ball according to claim 7, wherein the metal base comprises at least one metallic cation, selected from the group consisting of lithium, sodium, potassium, cesium, magnesium, calcium, barium, manganese, copper, zinc, titanium, tungsten, zirconium, and aluminum, and at least one anion, selected from the group consisting of hydroxide, alkoxide, acetate, carbonate, bicarbonate, oxide, formate, and nitrate.

9. The golf ball according to claim 7, wherein the first monomeric component comprises an α-olefin monomer having a terminal point of unsaturation.

10. The golf ball according to claim 9, wherein the first monomeric component has the formula:

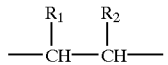

wherein:
  $R_1$ is hydrogen or an alkyl group; and
  $R_2$ is hydrogen, lower alkyl including $C_1$–$C_5$, carbocyclic, aromatic or heterocyclic.

11. The golf ball according to claim 10, wherein the first monomeric component is ethylene.

12. The golf ball according to claim 7, wherein the first monomeric component comprises from about 1 to about 99 percent by weight of the total polymer weight.

13. The golf ball according to claim 7, wherein the first monomeric component comprises from about 10 to about 95 percent by weight of the total polymer weight.

14. The golf ball according to claim 7, wherein the first monomeric component comprises from about 10 to about 70 percent by weight of the total polymer weight.

15. The golf ball according to claim 7, wherein the second monomeric component is an unsaturated acrylate class ester having the formula:

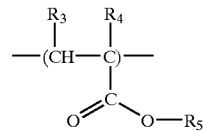

wherein:
  $R_3$ is hydrogen or an alkyl group;
  $R_4$ is hydrogen, lower alkyl including $C_1$–$C_5$, carbocyclic, aromatic or heterocyclic;
  $R_5$ is selected from the group consisting of $C_nH_{2n+1}$, for n=1 to 18 and phenyl, in which from 0 to 5 H within $R_4$ can be replaced by substituents selected from the group consisting of COOH, $SO_3H$, $NH_2$, succinic anhydride and their salts, F, Cl, Br, I, OH, SH, epoxy, silicone, lower alkyl esters, lower alkyl ethers, and aromatic or heterocyclic rings with the proviso that $R_4$ and $R_5$ can be combined to form a bicyclic ring.

16. The golf ball according to claim 15, wherein the second monomeric component comprises from about 99 to about 1 percent by weight of the total polymer weight.

17. The golf ball according to claim 15, wherein the second monomeric component comprises from about 90 to about 5 percent by weight of the total polymer weight.

18. The golf ball according to claim 15, wherein the second monomeric component comprises from about 90 to about 30 percent by weight of the total polymer weight.

19. The golf ball according to claim 7, further comprising a third monomeric component selected from the group consisting of carbon monoxide, sulfur dioxide, an anhydride monomer, an unsaturated monocarboxylic acid, an olefin having from 2 to 8 carbon atoms and a vinyl ester or a vinyl ether of an alkyl acid having from 4 to 21 carbon atoms.

20. The golf ball according to claim 7, further comprising a third monomeric component selected from the group consisting of:

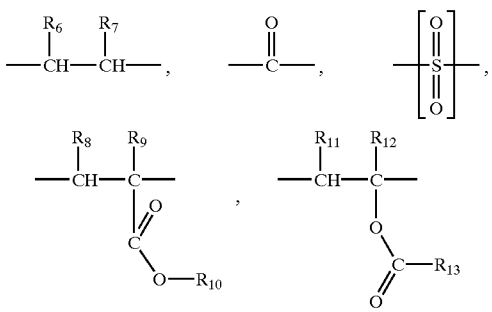

wherein:
  $R_6$ is hydrogen, lower alkyl including $C_1$–$C_5$, carbocyclic, aromatic, or heterocyclic;
  $R_7$ is hydrogen, lower alkyl including $C_1$–$C_5$, carbocyclic, aromatic, or heterocyclic;
  $R_8$ is hydrogen, lower alkyl including $C_1$–$C_5$, carbocyclic, aromatic, or heterocyclic;
  $R_9$ is hydrogen or lower alkyl including $C_1$–$C_5$;
  $R_{10}$ is hydrogen or is selected from the group consisting of $C_nH_{2n+1}$, for n=1 to 18 and phenyl, in which from 0 to 5 H within $R_{10}$ can be replaced by substituents selected from the group consisting of COOH, $SO_3H$, $NH_2$ and their salts, F, Cl, Br, I, OH, SH, silicon, lower alkyl esters, lower alkyl ethers and aromatic or heterocyclic rings with the proviso that $R_9$ and $R_{10}$ can be combined to form a bicyclic ring;

$R_{11}$ is hydrogen, lower alkyl including $C_1$–$C_5$, carbocyclic, aromatic, or heterocyclic;

$R_{12}$ is hydrogen or lower alkyl including $C_1$–$C_5$; and $R_{13}$ is hydrogen or is selected from the group consisting of $C_nH_{2n+1}$, for n=1 to 18 and phenyl, in which from 0 to 5 H within $R_{13}$ can be replaced by substituents selected from the group consisting of COOH, $SO_3H$, $NH_2$ and their salts, F, Cl, Br, I, OH, SH, silicon, lower alkyl esters, lower alkyl ethers and aromatic or heterocyclic rings with the proviso that $R_{12}$ and $R_{13}$ can be combined to form a bicyclic ring.

21. The golf ball according to claim 19, wherein the third monomeric component comprises up to about 49 percent by weight of the total polymer weight.

22. The golf ball according to claim 7, wherein the monomeric components of the polymer are present in a random, alternating, block or graft arrangement.

23. The golf ball according to claim 7, wherein the polymer is isotactic, syndiotactic, atactic, or a combination thereof.

24. The golf ball according to claim 1, wherein a grafting agent has been added to the saponified polymer to form a grafted polymer.

25. The golf ball according to claim 24, wherein the grafting agent comprises an anhydride having the formula:

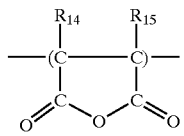

wherein:

$R_{14}$ and $R_{15}$ are the same or different and are selected from the group consisting of hydrogen, linear or branched chain alkyl and substituted or unsubstituted carboxylic groups.

26. The golf ball according to claim 24, wherein the grafting agent is added in an amount of between about 1 and 50 percent by weight of the polymer.

27. The golf ball according to claim 24, wherein the grafting agent is added in an amount of between about 1 and 25 percent by weight of the polymer.

28. The golf ball according to claim 24, wherein the grafting agent is added in an amount of between about 1 and 15 percent by weight of the polymer.

29. A golf ball comprising a cover and a core and a mantle situated between the cover and the core, wherein at least the core comprises at least one layer formed of a saponified polymer/oxa acid blend comprising from about 65 to about 99 parts of at least one saponified polymer and from about 35 to 1 parts of at least one oxa acid, based on 100 parts of the saponified polymer/oxa acid blend.

30. The golf ball according to claim 29, wherein the core is selected from the group consisting of wound cores, solid cores, hollow cores, cores filled with a fluid, and cores filled with a gel.

31. The golf ball according to claim 30, wherein the saponified polymer comprises a first olefinic, monomeric component having from 2 to 8 carbon atoms and a second monomeric component comprising an unsaturated carboxylic acid based acrylate class ester having from 4 to 22 carbon atoms and at least one ester group, wherein at least a portion of the ester groups have been saponified with an inorganic metal base.

32. The golf ball according to claim 29, wherein the oxa acids is a monoacid of the formula:

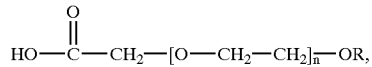

wherein n is an integer greater than or equal to 1, and R is H or an organic moiety selected from the group consisting of linear and branch chained alkyl, substituted and unsubstituted carbocyclic, and heterocyclic groups.

33. The golf ball according to claim 29, wherein the oxa acid is a diacid of the formula:

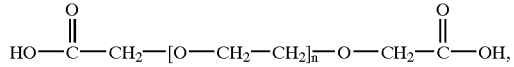

wherein n is an integer greater than or equal to 1.

34. The golf ball according to claim 29, wherein the at least one layer further comprises at least one polymeric composition selected from the group consisting of grafted metallocene catalyzed polymers, grafted metallocene catalyzed polymer blends, non-grafted metallocene catalyzed polymers, non-grafted metallocene catalyzed polymer blends, balata, and ionomers.

35. A process for forming a golf ball having a cover, a core, and an intermediate layer situated between the cover and the core comprising the steps of:

blending a saponified polymer with at least one oxa acid to form a saponified polymer/oxa acid blend; and forming at least one layer of the intermediate layer from the saponified polymer/oxa acid blend.

36. The process according to claim 35, further comprising:

forming a polymer comprising a first olefinic monomeric component having from 2 to 8 carbon atoms and a second monomeric component comprising an unsaturated carboxylic acid based acrylate class ester having from 4 to 22 carbon atoms;

applying a sufficient amount of heat to the polymer to convert the polymer to a substantially molten state;

forming a mixture by adding an inorganic metal base to the molten polymer; and saponifying the mixture to form a saponified polymer, wherein a sufficient amount of the inorganic metal base is added to the molten polymer in forming the mixture to obtain a degree of saponification of the polymer ranging between about 1 and 50 percent.

37. The process according to claim 36, further comprising forming the mixture of the inorganic metal base and the molten polymer at a temperature such that the mixture has a viscosity that remains substantially unchanged from that of the molten polymer.

38. The process according to claim 36, further comprising forming the polymer with a third monomeric component, selected from the group consisting of carbon monoxide, sulfur dioxide, an anhydride monomer, an unsaturated monocarboxylic acid, an olefin having from 2 to 8 carbon atoms, and a vinyl ester or a vinyl ether of an alkyl acid having from 4 to 21 carbon atoms.

* * * * *